3,223,743
DEHYDROGENATION OF ETHYLBENZENE
Alistair C. MacFarlane, Texas City, Tex., assignor to Monsanto Chemical Company, St. Louis, Mo., a corporation of Delaware
No Drawing. Filed Dec. 29, 1961, Ser. No. 163,022
6 Claims. (Cl. 260—669)

This invention relates to an improved process for the catalytic dehydrogenation of ethylbenzene to produce styrene. More particularly, this invention is concerned with a process which incorporates an improved catalyst bed to derive higher conversions and yields when dehydrogenating ethylbenzene to styrene.

In view of its utility in the production of plastics, styrene has achieved considerable industrial importance. It may be polymerized with various comonomers to produce a variety of synthetic rubbers and to yield resins which are suitable for manufacturing numerous articles of commerce by casting, compressing, molding and the like. Besides being used with other polymerizable materials, styrene may be homopolymerized to produce polystyrene, one of the most widely used synthetic resins.

It is well known that styrene is produced commercially by the catalytic dehydrogenation of ethylbenzene. The process is usually carried out by passing ethylbenzene and a relatively large proportion of steam, e.g., 1 to 30 mols of steam per mol of hydrocarbon, over a bed of suitable catalyst at elevated temperatures. The catalysts used in the process usually contain as the primary active constituent metals of Groups IV to VIII of the Periodic Table either in their free form or, preferably in the form of various of their compounds such as the oxides, sulfides, phosphates, etc. Generally, mixtures of two, three, or more of such compounds are employed. Some of these catalysts are characterized by certain disadvantages such as low conversion and/or selectivity of reaction, poor physical strength, short catalyst life and necessity for frequent regeneration. Typical catalysts which have been found to have a minimum of these disadvantages are catalysts containing iron oxide together with a small amount of another metal oxide more difficulty reducible than that of iron as a stabilizer and a small amount of an alkali metal compound as a promoter. These catalysts are autoregenertive under conditions at which the dehydrogenation reaction is carried out, i.e., they are capable of being continuously regenerated under the conditions of the reaction. This obviates the necessity for interrupting the process and regenerating the catalyst which includes burning of the carbon deposits off the surface of the catalyst particles which is required in other dehydrogenation systems. While these catalysts are generally suitable and widely used because of the above-mentioned advantages, as currently employed in the art, they do not provide for maximum activity and/or maximum mol percent selectivity to styrene in the reaction.

The high conversion of styrene from the catalytic dehydrogenation of ethylbenzene is favored by a high temperature and a low pressure. There are also two major undesirable side reactions which simultaneously occur to produce benzene and toluene. These reactions go to completion and are not limited by equilibrium considerations. Their temperature co-efficients are usually greater than the main reaction and thus a high temperature will decrease the styrene yield. However, a low temperature is not desirable since it is known that low temperature means low conversion and therefore a low production of styrene. This dilemma can be overcome in one manner by maintaining different temperatures throughout the reactor. At the reactor inlet where the concentration of ethylbenzene is high and the main reaction is far removed from equilibrium, a relatively low temperature can be tolerated. However, at the outlet the rate of the main reaction to styrene is very low since it is approaching equilibrium and a high temperature is required from the kinetic viewpoint as well as from the equilibrium conversion viewpoint. A rising temperature profile throughout the reactor will provide desirable temperatures and equilibrium conditions.

This invention is concerned with accomplishing improved styrene conversions and yield by the use of successive layers of catalyst each of which has a different composition and different properties. This novel catalyst bed provides the same or improved results over the above described temperature arrangement and does not require any change from the usual adiabatic or isothermal reactor. Basically this invention has to do with improving the selectivity and activity of a given dehydrogenation catalyst bed.

Selectivity of a catalyst is defined as the amount of styrene produced per quantity of ethylbenzene reacted. Activity of the catalyst is defined as the quantity of styrene produced per unit time per unit of catalyst per unit concentration of ethylbenzene fed at a given temperature. Some catalysts have high selectivity and this means low raw material cost and hence low manufacturing cost. Other catalysts have high activity and this means small reactors will suffice and hence low capital is required.

It is very difficult, though, to obtain a catalyst which has both high selectivity and high activity since generally high selectivity results in low activity and vice versa. It has now been discovered that a layered catalyst bed containing at least two layers, one of which is a highly selective catalyst and one of which is a highly active catalyst, will accomplish the same objective as a catalyst which is highly selective and highly active, that is, it will produce a high yield and a high conversion of ethylbenzene to styrene.

It is, therefore, the object of this invention to provide an improved process for the catalytic dehydrogenation of ethylbenzene to styrene. It is a further object of this invention to provide a novel type of catalyst bed arrangement which will dehydrogenate ethylbenzene to styrene at improved conversions and improved yields. It is still another object of the invention to provide a layered catalyst bed which because of its gradated composition, will produce styrene from ethylbenzene in improved quantities. These and other objectives of the invention will become apparent from the following description.

According to this invention, ethylbenzene is dehydrogenated to styrene in a catalytic reactor at improved conversions and yields by passing ethylbenzene successively over at least two layers of dehydrogenation catalysts of varying compositions, one of said catalysts being highly selective and one of said catalysts being highly active, thus providing a layered bed of catalyst which changes successively from a highly selective catalyst composition to a highly active catalyst composition.

The method of the present invention is illustrated by the following examples but they are not to be construed as limiting the invention in any manner whatsoever.

*Example I*

A catalyst composition containing 49 percent by weight of iron oxide, 1 percent by weight cerium oxide, 26 percent by weight potassium pyrophosphate, 20 percent calcium aluminate and 2.5 percent chromium oxide was placed in a 1½ inch in diameter steel tube on a stainless steel screen to a depth of about 40 inches. The catalyst was in 1/16 of an inch in diameter pellets and amounted to 1246 grams in weight. The reactor was heated and steam was passed through it overnight to remove air from the system. Ethylbenzene (99.5 percent purity) with steam in a weight ratio of steam to ethylbenzene of 2.2 to 1 was passed through the reactor at a rate of 200 grams per hour, a pressure of 1.5 p.s.i.g. and at a temperature in the range of about 600° C. over a reaction period of about 1,000 hours. Temperatures were recorded by means of thermocouples located in the reactor.

The ethylbenzene and steam passed down the reactor and through the catalyst bed into a water cooled condenser and condensate was collected in a receiving flask. Non-condensible gas was passed through a wet-test meter and vented after measurement. Samples of the organic condensate were analyzed for styrene, benzene and toluene with precautions taken to prevent any losses of benzene and toluene from the sample. The percent conversion of ethylbenzene to styrene and the selectivity of the catalyst were calculated. The conversion of ethylbenzene to styrene was determined to be approximately 34 percent. The selectivity of the catalyst to styrene was calculated to be 97.5 percent. Selectivity was calculated as the product of the moles of styrene divided by styrene plus benzene plus toluene multiplied by 100.

*Example II*

A catalyst composition of approximately 90 percent by weight of iron oxide, 5 percent by weight of potassium oxide and 3 percent by weight of chromium oxide and known as "Shell 105" catalyst, was placed in the 1½ inch in diameter reactor as described in Example I to a height of approximately 40 inches. The catalyst was in the form of 1/8 of an inch in diameter pellets and weighed a total of 1,375 grams. The identical ethylbenzene used in Example I with steam in a weight ratio of steam to ethylbenzene of 2.2 to 1 was passed through the reactor at a rate of 200 grams per hour, a pressure of 1 p.s.i.g. and at a temperature in the range of about 600° C. over a reaction period of approximately 1,000 hours. The run was conducted in the same manner as that in Example I. The conversion of ethylbenzene to styrene was determined to be approximately 59.5 percent. The selectivity to styrene of the catalyst was calculated to be 85.5 percent.

*Example III*

A catalyst composition composed of 614 grams of 1/16 inch in diameter pellets identical to that in Example I was superimposed onto a catalyst composition composed of 668 grams of 1/8 inch in diameter pellets identical to that in Example II. The two layers of catalyst were placed in the 1½ inch in diameter reactor of Example I, such that each layer of catalyst was approximately 20 inches in height. The identical ethylbenzene as used in Example I and II with steam in a weight ratio of steam to ethylbenzene of 2.2 to 1 was passed down through the reactor bed contacting successively the 1/16 inch pellets and then the 1/8 inch pellets at a rate of 200 grams per hour, a pressure of from 1 to 1.5 p.s.i.g. and at a temperature in the range of about 600° C. over a reaction period of approximately 1,180 hours. The conversion of ethylbenzene to styrene was found to be approximately 64.2 percent. The average catalyst selectivity to styrene was calculated to be 91.9 percent.

The examples above clearly show that when a catalyst bed composed of two different compositions of catalyst are used, the conversion of ethylbenzene to styrene together with the overall selectivity to styrene show considerable improvements over that obtained when using a single layered catalyst bed comprised of one composition of catalyst. In fact, it is so unexpected that one would obtain these increased conversions and yields together as to be clearly novel over any disclosure in the prior art.

In carrying out this process, conditions may be widely varied. The dehydrogenation reaction may be carried out at any temperature in the range from about 500° C. to about 800° C. and at any desired pressure from about 1 p.s.i.a. to about 30 p.s.i.a. It is advantageous, to maintain the pressure as low as possible but ordinarily atmospheric pressure is employed. The preferred temperature range is generally from about 550° C. to about 700° C. The steam diluent is utilized in any amount from one to about 30 moles of steam per mole of ethylbenzene charged.

Recycle of unconverted ethylbenzene is accomplished in substantially all applications of this process. The catalyst chambers or reactors may be adiabetic, isothermal, or of a rising temperature profile, the latter being more desirable from the process standpoint. The size and shape of the catalyst particles is not critical and may be varied over any reasonable range. The catalyst may be used in the form of pellets, tablets, spheres, pills, saddles, powder, etc. Symmetrical pellets from about 1/50 of an inch to about 3/4 of an inch in diameter and from about 1/16 of an inch to 1 inch in length are generally satisfactory.

The composition of the dehydrogenation catalysts employed in this invention may also vary considerably. The catalyst used for this initial layer in the reactor must be a catalyst of exceptionally high selectivity. This catalyst may be of any composition which results in a high selectivity but generally, it is an iron oxide catalyst to which has been added a water gas promoter, at least one structural promoter which contributes stability and increased selectivity, and a binder; or a titanium or zirconium oxide catalyst promoted with an alkali metal compound.

The structural promoters referred to in the above iron oxide catalyst must be present in an amount from about 0.5 percent to about 5 percent by weight of the catalyst and may be comprised of at least one of the compounds of the following groups: oxides of copper, zinc and cadmium non-acidic transition oxides of chromium, manganese, cobalt and nickel and non-acidic oxides of thorium, zirconium, cerium, lead, bismuth and aluminum. Chromium and cerium are the preferred oxides for use in this highly selective catalyst.

The water gas promoter which must be present in an amount from about 1 percent to about 35 percent by weight of the catalyst is a selective oxide poison such as a phosphate or a fluoride of an alkali or alkaline earth metal. Potassium pyrophosphate is the preferred water gas promoter in this catalyst layer although the alkali or alkaline earth metal may be any one of the group, cesium, rubidium, calcium, barium, magnesium, and strontium.

The iron oxide constituent of this catalyst may vary from about 20 percent to about 80 percent by weight of the catalyst with the remainder of the catalyst being composed of a binding agent such as silicate, cement, kaolin, and the like with calcium aluminate being preferred.

The highly selective titanium or zirconium oxide catalyst composition should contain from about 45 percent to about 95 percent by weight of this major component. The alkali metal promoter which is an essential constituent of this catalyst may vary in amounts from about 5 percent to about 35 percent by weight of the catalyst composition. The preferred promoters are compounds of potassium such as potassium carbonate and potassium oxide. Other ingredients may be present or not, if desired, in this catalyst composition. A structural promoter such as chromium oxide, may be present in varying amounts, preferably from about 1 percent to about 5 percent by weight of the total catalyst. Diluent materials such as silicates, cement, kaolin, and aluminates may be incorporated into the catalyst to act as binding agents.

For the final layer of catalyst in the reactor, ordinarily any metal oxide more difficultly reducible than iron oxide is used as a promoter with the iron oxide and another compound to structurally promote or stabilize the catalyst.

The following may be used as structural promoters if desired: oxides of copper, zinc and cadmium; non-acidic, transition oxides of chromium, manganese, cobalt and nickel; and non-acidic oxides of thorium, zirconium, cerium, lead, bismuth and aluminum. Chromium, however, is the most widely employed and universally preferred structural promoter. Among the alkali and alkaline earth metal oxides which are used as promoters, the oxides of potassium, cesium, rubidium, calcium, barium, magnesium and strontium are generally preferred with potassium being the most widely used.

The amount of structural promoters which may be employed in the above described catalyst composition is from about 0.5 percent by weight to about 5 percent by weight of the catalyst composition. The amount of promoter in the catalyst may vary from about 1 percent by weight to about 50 percent by weight of the catalyst. Preferably, however, the promoter is incorporated in the catalyst in amounts from about 3 percent to about 30 percent by weight.

In addition to its utility in the dehydrogenation of ethylbenzene to styrene, the improved process of this invention is applicable for use in the dehydrogenation of various other aromatic hydrocarbons having an alkyl side chain of at least two carbon atoms such as, for example, propylbenzene, diethylbenzene, ethyltoluene, propyltoluene, ethylnaphthalene, diethylnaphthalene, diethyl diphenyl, and the like. Likewise, the process of the invention is suitable for use in the production of diolefins by dehydrogenation of mono-olefins having at least four non-quaternary carbon atoms in a straight chain. They are particularly useful, for example, in the production of butadiene from butylene and are also applicable and advantageous for the production of other diolefins and particularly conjugated diolefins such as piperylene, isoprene, the various hexadienes, and the like from the corresponding mono-olefins.

To achieve the improved results of this process, it is of particular importance to employ as the initial layer of the catalyst bed a composition which is of exceptionally high selectivity and to employ as the final layer a catalyst composition which is of exceptionally high activity. In this respect the initial catalyst layer should have a selectivity of at least 90 percent and preferably as high as 95 percent. The final layer of catalyst should have an activity which will result in a conversion of ethylbenzene to styrene closely approaching the chemical equilibrium. Generally closely approaching the chemical equilibrium is understood by those skilled in the art as meaning approaching within about 5 percent to the equilibrium conversion at a given temperature and pressure. The other layers of catalyst in the bed, if any, may be of any composition which have selectivities and activities both of which are intermediate between those of the initial and final layers to do the bulk of dehydrogenation.

What is claimed is:

1. In a process for the dehydrogenation of ethylbenzene to form styrene in the presence of added steam at elevated temperatures, the improvement which comprises successively passing the vaporous ethylbenzene-steam mixture through a fixed bed of dehydrogenation catalysts arranged in at least two layers, the initial layer of catalyst being one wherein the selectivity to styrene is at least 90 percent, the catalyst of said initial layer of catalyst having a major constituent selected from the group consisting of iron oxide, titanium oxide, and zirconium oxide which is promoted with at least one alkali metal salt and structurally promoted with at least one metal oxide, and the final layer of catalyst being one wherein the activity is high enough to yield conversion of ethylbenzene to styrene approaching within about 5 percent of the chemical equilibrium conversion, the catalyst of said final layer of catalyst having a major proportion of iron oxide which is promoted with an alkali metal oxide.

2. In a process for the dehydrogenation of ethylbenzene to form styrene in the presence of added steam at elevated temperatures, the improvement which comprises successively passing the vaporous ethylbenzene-steam mixture through a fixed bed of dehydrogenation catalysts arranged in at least two layers, the initial layer of catalyst being one wherein the selectivity to styrene is at least 90 percent, the catalyst of said initial layer of catalyst having a major constituent selected from the group consisting of iron oxide, titanium oxide, and zirconium oxide which is promoted with at least one alkaline earth metal salt and structurally promoted with at least one metal oxide, and the final layer of catalyst being one wherein the activity is high enough to yield conversion of ethylbenzene to styrene approaching within about 5 percent to the chemical equilibrium conversion, the catalyst of said final layer of catalyst having a major proportion of iron oxide which is promoted with an alkaline earth metal oxide.

3. In a process for the dehydrogenation of ethylbenzene to form styrene in the presence of added steam at elevated temperatures, the improvement which comprises successively passing the vaporous ethylbenzene-steam mixture through a fixed bed of dehydrogenation catalysts arranged in at least two layers, the initial layer of catalyst being one wherein the selectivity to styrene is at least 90 percent, the catalyst of said initial layer of catalyst having a major constituent selected from the group consisting of iron oxide, titanium oxide, and zirconium oxide promoted with a metal salt selected from the group consisting of the salts of potassium, cesium, calcium, and strontium, structurally promoted with at least one metal oxide selected from the group consisting of the oxides of copper, zinc, cadmium, chromium, magnesium, cobalt, nickel, thorium, zirconium, cerium, lead, bismuth, and aluminum and a binding agent selected from the group consisting of silicates, aluminates, cement, and kaolin, and the final layer of catalyst being one wherein the activity is high enough to yield conversion of ethylbenzene to styrene approaching within about 5 percent of the chemical equilibrium conversion, the catalyst of said final layer of catalyst having a major proportion of iron oxide which is promoted with an alkali metal oxide.

4. In a process for the dehydrogenation of ethylbenzene to form styrene in the presence of added steam at elevated temperatures, the improvement which comprises successively passing the vaporous ethylbenzene-steam mixture through a fixed bed of dehydrogenation catalysts arranged in at least two layers, the initial layer of catalyst being one wherein the selectivity to styrene is at least 90 percent, the catalyst of said initial layer of catalyst having a major constituent selected from the group consisting of iron oxide, titanium oxide, and zirconium oxide which is promoted with at least one alkali metal salt and structurally promoted with at least one metal oxide, and the final layer of catalyst being one wherein the activity is high enough to yield conversion of ethylbenzene to styrene approaching within about 5 percent of the chemical equilibrium conversion, the catalyst of said final layer of catalyst having a major proportion of iron oxide which is promoted with an oxide selected from the group consisting of the oxides of potassium, cesium, calcium, and strontium, and structurally promoted with a metal oxide selected from the group consisting of the oxides of copper, zinc, cadmium, chromium, magnesium, cobalt, nickel, thorium, zirconium, cerium, lead, bismuth and aluminum.

5. In a process for the dehydrogenation of ethylbenzene to form styrene in the presence of added steam at elevated temperatures, the improvement which comprises successively passing the vaporous ethylbenzene-steam mixture through a fixed bed of dehydrogenation catalyst comprising at least two layers, the catalyst in the layer of said fixed bed first contacted by the reactants being a promoted iron oxide catalyst having a selectivity to styrene of at least 90% and the catalyst in the layer of said fixed bed last contacted by the reactants being a promoted iron oxide catalyst of different composition than said catalyst first contacted by the reactants and having a dehydrogenation activity resulting in a conversion of ethylbenzene to styrene approaching within 5% of the chemical equilibrium conversion.

6. The process of claim 5 wherein said layer of catalyst first contacted by the reactants separated from said layer of catalyst last contacted by the reactants by an intermediate layer of catalyst having a selectivity and an activity intermediate the selectivity and activity of the adjacent layers of catalyst.

References Cited by the Examiner

UNITED STATES PATENTS

| | | | |
|---|---|---|---|
| 1,945,960 | 2/1934 | Winkler et al. | 260—669 |
| 2,184,235 | 12/1939 | Groll et al. | 260—669 |
| 2,300,971 | 11/1942 | Roberts et al. | 260—669 |
| 2,370,797 | 3/1945 | Kearby | 260—669 |
| 2,392,750 | 1/1946 | Linn | 260—669 |
| 2,395,875 | 3/1946 | Kearby | 260—669 |

DELBERT E. GANTZ, *Primary Examiner.*

ALPHONSO D. SULLIVAN, *Examiner.*